(12) United States Patent
Pappenheimer

(10) Patent No.: US 8,931,462 B2
(45) Date of Patent: Jan. 13, 2015

(54) EGR SYSTEM FOR AN INTERNAL COMBUSTION ENGINE THAT FEEDS EXHAUST GAS INDEPENDENT OF INTAKE AIR

(75) Inventor: Andreas Pappenheimer, Ellingen (DE)

(73) Assignee: MAN Truck & Bus AG, Munich (DE)

( * ) Notice: Subject to any disclaimer, the term of this patent is extended or adjusted under 35 U.S.C. 154(b) by 240 days.

(21) Appl. No.: 13/033,982

(22) Filed: Feb. 24, 2011

(65) Prior Publication Data

US 2011/0203558 A1    Aug. 25, 2011

(30) Foreign Application Priority Data

Feb. 25, 2010    (DE) .......................... 10 2010 009 287

(51) Int. Cl.
   *F02B 1/00*      (2006.01)
   *F02D 41/00*    (2006.01)
   *F02M 25/07*    (2006.01)

(52) U.S. Cl.
   CPC .......... *F02D 41/005* (2013.01); *F02D 41/0082* (2013.01); *F02M 25/0749* (2013.01); *F02D 2041/0017* (2013.01); *Y02T 10/47* (2013.01)
   USPC .............. 123/568.18; 123/568.11; 123/198 F

(58) Field of Classification Search
   CPC .. F01L 2800/00; F01L 13/0005; Y02T 10/18; Y02T 10/42; F02B 1/12; F02D 13/0276; F02M 25/0723; F02M 25/0744; F02M 25/0745; F02M 25/0748
   USPC .................. 123/568.11, 568.12, 568.15, 698, 123/559.1, 568.18, 568.14, 568.13, 58.8, 123/302, 275, 198 F, 64, 568.2, 568.17; 701/108; 60/605.1, 605.2, 598, 599, 60/602

See application file for complete search history.

(56) References Cited

U.S. PATENT DOCUMENTS 4,131,095 A * 12/1978 Ouchi .......................... 123/58.8
4,237,832 A * 12/1980 Hartig et al. .................. 123/58.8
(Continued)

FOREIGN PATENT DOCUMENTS

DE    20 2007 007 117 U1    10/2007
DE    10 2006 037 934 A1    2/2008
(Continued)

*Primary Examiner* — Hai Huynh
*Assistant Examiner* — Gonzalo Laguarda
(74) *Attorney, Agent, or Firm* — Laurence A. Greenberg; Werner H. Stemer; Ralph E. Locher

(57) ABSTRACT

An internal combustion engine of a motor vehicle has a multi-channel fresh gas system with a plurality of fresh gas lines leading to different cylinder groups. At least one shut-off element is connected in each of the fresh gas lines and coupled to a control and/or regulating device. A multi-channel exhaust system for the discharge of exhaust gas out of the cylinders has a plurality of exhaust lines leading away from the different cylinder groups. A multi-channel exhaust-gas recirculation system has exhaust-gas recirculation lines, for recirculating exhaust gas from the exhaust system to the fresh gas system. The method and device utilize crossed-channel exhaust-gas recirculation, in which the exhaust-gas recirculation lines branching off from the exhaust lines of a certain channel lead back in each case to fresh gas lines of a different channel. The shut-off elements of the individual fresh gas lines are actuated such that a fresh gas line which is shut off from the fresh gas supply by a shut-off element is supplied with exhaust gas from an exhaust line of a different channel, whose associated fresh gas line is not shut off from the fresh gas supply, via an exhaust-gas recirculation line.

10 Claims, 1 Drawing Sheet

(56) References Cited

U.S. PATENT DOCUMENTS

| | | | |
|---|---|---|---|
| 4,276,865 A * | 7/1981 | Hamai | 123/275 |
| 4,506,633 A * | 3/1985 | Britsch | 123/58.8 |
| 4,630,575 A * | 12/1986 | Hatamura et al. | 123/184.48 |
| 4,898,206 A * | 2/1990 | Meistrick et al. | 137/512.3 |
| 5,562,086 A * | 10/1996 | Asada et al. | 123/568.21 |
| 6,431,128 B1 * | 8/2002 | Dabadie | 123/58.8 |
| 6,543,230 B1 * | 4/2003 | Schmid | 60/605.2 |
| 6,923,149 B2 * | 8/2005 | Nishimoto et al. | 123/58.8 |
| 6,941,905 B2 * | 9/2005 | Hitomi et al. | 123/58.8 |
| 6,971,343 B2 * | 12/2005 | Hitomi et al. | 123/58.8 |
| 7,182,050 B2 * | 2/2007 | Hitomi et al. | 123/58.8 |
| 7,556,027 B2 * | 7/2009 | Duret | 123/568.13 |
| 7,801,664 B2 * | 9/2010 | Winstead | 701/103 |
| 7,841,324 B2 * | 11/2010 | Dirker et al. | 123/568.13 |
| 8,074,629 B2 * | 12/2011 | Winstead | 123/568.14 |
| 8,671,920 B2 * | 3/2014 | Hayman et al. | 123/568.11 |

FOREIGN PATENT DOCUMENTS

| | | |
|---|---|---|
| DE | 10 2007 009 353 A1 | 9/2008 |
| DE | 10 2007 025 179 A1 | 9/2008 |
| DE | 10 2008 046 594 A1 | 1/2010 |
| DE | 10 2008 046 596 A1 | 1/2010 |

* cited by examiner

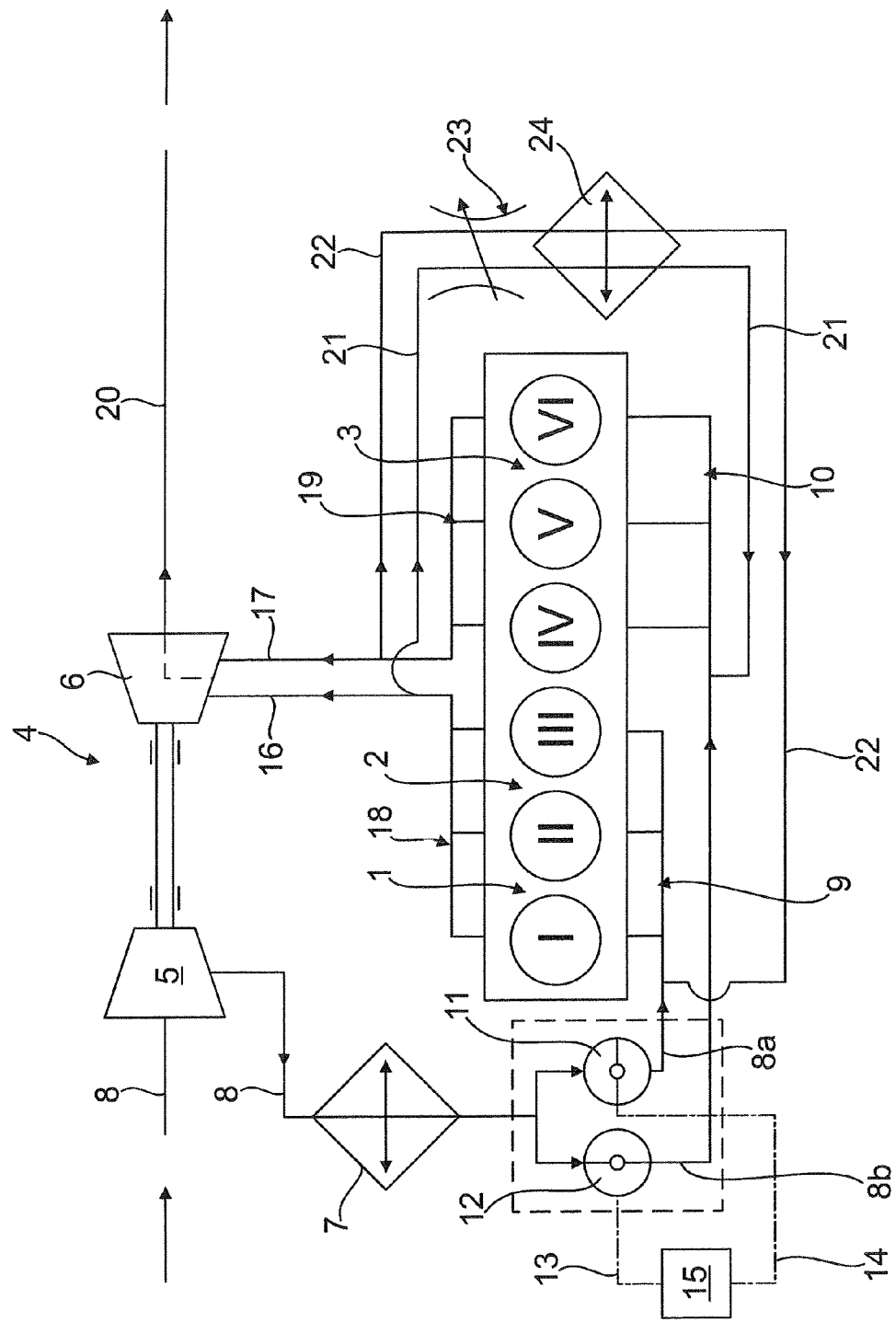

EGR SYSTEM FOR AN INTERNAL COMBUSTION ENGINE THAT FEEDS EXHAUST GAS INDEPENDENT OF INTAKE AIR

CROSS-REFERENCE TO RELATED APPLICATION

This application claims the priority, under 35 U.S.C. §119, of German application DE 10 2010 009 287.8, filed Feb. 25, 2010; the prior application is herewith incorporated by reference in its entirety.

BACKGROUND OF THE INVENTION

Field of the Invention

The invention relates to a method for operating an internal combustion engine, in particular internal combustion engine of a motor vehicle, having a multi-channel fresh gas system for the supply of fresh gas to cylinders of the internal combustion engine, which fresh gas system has a plurality of fresh gas lines which lead to different cylinder groups which have in each case at least one cylinder, wherein in each of the fresh gas lines there is arranged at least one shut-off element which is coupled to a control and/or regulating device by means of which the supply of fresh gas to the internal combustion engine can be enabled or shut off to a defined extent in a controlled or regulated manner as a function of defined internal combustion engine operating parameters, having a multi-channel exhaust system for the discharge of exhaust gas out of the cylinders, which exhaust system has a plurality of exhaust lines, in particular corresponding in number to the number of fresh gas lines, which lead away from the different cylinder groups, and having a multi-channel exhaust-gas recirculation system, which is formed with a plurality of exhaust-gas recirculation lines, for recirculating exhaust gas from the exhaust system to the fresh gas system, wherein at least one exhaust-gas recirculation line branches off, and leads back to the fresh gas system, from at least a part of the exhaust lines The invention further relates to a device for operating an internal combustion engine, in particular an internal combustion engine of a motor vehicle, and in particular for carrying out the method.

Internal combustion engines having exhaust-gas recirculation are generally known. Exhaust-gas recirculation, that is to say the branching off of a partial exhaust-gas flow from the exhaust section of the internal combustion engine and the recirculation of the partial exhaust-gas flow into the intake section of the internal combustion engine, is used in particular for the reduction of nitrogen oxide emissions. Furthermore, exhaust-gas recirculation may also be used to reduce the specific fuel consumption, for example in partial-load operation of internal combustion engines.

Furthermore, exhaust-gas recirculation is also known with supercharged internal combustion engines, specifically in general on a high-pressure side of a turbocharger. Here, a partial exhaust-gas flow is extracted upstream of the turbine of the turbocharger as viewed in the flow direction of the exhaust-gas flow, and is supplied to the charge air flow again downstream of a compressor of the turbocharger. The air mass flows which can be realized by means of such exhaust-gas recirculation are significantly dependent on the scavenging pressure gradient across the internal combustion engine, because the recirculated exhaust-gas flow must flow in against the pressure of the supercharged air. In operating states with a low scavenging pressure gradient, therefore, efficient exhaust-gas recirculation is not possible.

As a realistic example, German published, non-prosecuted patent application DE 10 2006 037 934 A1 describes an internal combustion engine having exhaust-gas recirculation in which a fresh gas system is provided for the supply of fresh gas to combustion chambers of the internal combustion engine. Said internal combustion engine also comprises an exhaust system for the discharge of exhaust gas out of the cylinders, and an exhaust-gas recirculation system for recirculating exhaust gas from the exhaust system into the fresh gas system. The fresh gas system has two fresh gas lines which lead in each case to a separate cylinder group of the internal combustion engine, wherein in each of the fresh gas lines there is arranged a shut-off element, referred to as a switching valve, which is coupled to a control and/or regulating device by means of which the supply of fresh gas to the internal combustion engine can be enabled or shut off to a defined extent in a controlled or regulated manner as a function of defined internal combustion engine operating parameters. From each of the cylinder groups there leads away an exhaust line from which, in turn, exhaust-gas recirculation lines branch off which lead back to the fresh gas line of that cylinder group from which the exhaust line, and therefore the exhaust-gas recirculation line, branches off. Here, the control device is designed such that, during an intake process of the cylinder, it actuates the respective switching valve or shut-off element in order to open the flow cross section. In this way, a vacuum can be obtained downstream of the fresh gas system or in the respective fresh gas line up to the time at which the switching valve is opened. This is because, during the intake process, the volume of the respective combustion chamber is increased by means of a corresponding piston movement in the associated cylinder. The pressure drop at the fresh gas side increases the pressure difference between the fresh gas side and exhaust gas side, such that the respective non-return shut-off valve opens, and permits a recirculation of exhaust gas, when the predefined pressure difference is reached. Here, the fresh-gas-line-mounted shut-off elements or switching valves are actuated, and thereby opened and closed, cyclically. With such an arrangement, it is basically possible to obtain desired exhaust-gas recirculation rates more independently of a scavenging pressure gradient. As a result of the cyclic shutting-off of the charge air channels with parallel exhaust-gas recirculation, the emissions of nitrogen oxides are also improved in relation to permanent throttling.

Internal combustion engines having exhaust-gas recirculation and fresh-gas-side shut-off elements are also described in German patent application DE 10 2007 009 353 A1, in German utility model DE 20 2007 007 117 U1, and in German published patent applications DE 10 2007 025 179 A1, DE 10 2008 046 596 A1 and DE 10 2008 046 594 A1.

SUMMARY OF THE INVENTION

It is accordingly an object of the invention to provide a method and device for operating an internal combustion engine which overcome the above-mentioned disadvantages of the heretofore-known devices and methods of this general type and which provides for a method and a device for operating an internal combustion engine, in particular an internal combustion engine of a motor vehicle, by way of which the exhaust-gas recirculation rate can be increased further and/or the charging of the cylinders or combustion chambers of the internal combustion engine can be further improved.

With the foregoing and other objects in view there is provided, in accordance with the invention, a method for operating an internal combustion engine, in particular an internal combustion engine of a motor vehicle. The internal combustion engine comprising:

a plurality of cylinders arranged in cylinder groups each having at least one cylinder;

a multi-channel fresh gas system for supplying fresh gas to the cylinders of the internal combustion engine, the fresh gas system having a plurality of fresh gas lines respectively leading to different cylinder groups;

at least one shut-off element disposed in each of the fresh gas lines and connected to a control and/or regulating device for selectively enabling or disabling a supply of fresh gas to the internal combustion engine to a defined extent in a controlled or regulated manner as a function of defined internal combustion engine operating parameters;

a multi-channel exhaust system for discharging exhaust gas from the cylinders, the exhaust system having a plurality of exhaust lines leading away from the cylinder groups (in a preferred embodiment, a number of the exhaust lines corresponds to a number of the fresh gas lines); and a multi-channel exhaust-gas recirculation system formed with a plurality of exhaust-gas recirculation lines, for recirculating exhaust gas from the exhaust system to the fresh gas system, wherein at least one of the exhaust-gas recirculation lines branches off from at least a part of the exhaust lines and leads back to the fresh gas system.

The method according to the invention comprises:

conducting the exhaust gas in crossed-channel exhaust-gas recirculation by leading back the exhaust-gas recirculation lines branching off from the exhaust lines of a given channel to fresh gas lines of a respectively different channel;

actuating the shut-off elements of the individual fresh gas lines such that a fresh gas line that is shut off from the fresh gas supply by way of a shut-off element is supplied with exhaust gas from an exhaust line of a different channel, whose associated fresh gas line is not shut off from the fresh gas supply, via an exhaust-gas recirculation line.

In other words, the objects of the invention are achieved by way of a method and a device for operating an internal combustion engine, in particular for operating an internal combustion engine of a motor vehicle, having a multi-channel fresh gas system for the supply of fresh gas to cylinders of the internal combustion engine, which fresh gas system has a plurality of fresh gas lines which lead to different cylinder groups which have in each case at least one cylinder, wherein in each of the fresh gas lines there is arranged at least one shut-off element which is coupled to a control and/or regulating device by means of which the supply of fresh gas to the internal combustion engine can be enabled or shut off to a defined extent in a controlled or regulated manner as a function of defined internal combustion engine operating parameters. Also provided is a multi-channel exhaust system for the discharge of exhaust gas out of the cylinders, which exhaust system has a plurality of exhaust lines, in particular corresponding in number to the number of fresh gas lines, which lead away from the different cylinder groups. Also provided is a multi-channel exhaust-gas recirculation system, which is formed with a plurality of exhaust-gas recirculation lines, for recirculating exhaust gas from the exhaust system to the fresh gas system, wherein at least one exhaust-gas recirculation line branches off, and leads back to the fresh gas system, from at least a part of the exhaust lines. According to the invention, crossed-channel exhaust-gas recirculation takes place, in which the exhaust-gas recirculation lines branching off from the exhaust lines of a certain channel lead back in each case to fresh gas lines of a different channel. With such a design, it is particularly preferable to realize a method in which a fresh gas line or channel which is shut off from the fresh gas supply by means of a shut-off element is supplied with exhaust gas from an exhaust line of a different channel, whose associated fresh gas line is not shut off from the fresh gas supply, via an exhaust-gas recirculation line.

With such a configuration according to the invention and such a method implementation according to the invention, an exhaust-gas recirculation rate is obtained which is even higher than that in the prior art and which is based in particular on the coincidence of the shutting-off of one channel of the fresh gas system with the arrival of an exhaust-gas recirculation pressure wave in the other channel. This corresponds to a temporarily more negative scavenging gradient, with which a larger amount of recirculated exhaust gas passes to the respective cylinder group or into the respective intake pipe. Furthermore, with the crossed-channel exhaust-gas recirculation according to the invention, the charging of the cylinders is also improved in relation to conventional parallel exhaust-gas recirculation.

The crossed-channel exhaust-gas recirculation with cyclic shutting-off of the fresh gas channels also exhibits an improvement with regard to nitrogen oxide emissions in relation to parallel exhaust-gas recirculation with cyclic shutting-off of the fresh gas channels.

The crossed-flow exhaust-gas recirculation according to the invention may basically be realized using components which have more than two channels, for example in conjunction with a three-channel design, in which for example a first exhaust-gas recirculation line which is assigned to a first cylinder group leads back to a fresh gas line assigned to a second cylinder group, while an exhaust-gas recirculation line assigned to a second cylinder group leads back to a third fresh gas line assigned to a third cylinder group, and a third exhaust-gas recirculation line assigned to a third cylinder group leads back to a first fresh gas line assigned to a first cylinder group. This example is intended to show that any desired crossed multi-channel arrangements are possible which are based on the claimed basic principle. What is particularly advantageous in practice, however, is an embodiment of the device in which the fresh gas system, the exhaust system and the exhaust-gas recirculation system are in each case of two-channel design, as described in more detail below:

A two-channel design of said type provides that a first exhaust-gas recirculation line which branches off from a first exhaust line and which is therefore assigned to the first cylinder group leads back to or opens out into a second fresh gas line assigned to a second cylinder group, and in which the second exhaust-gas recirculation line which branches off from the second exhaust line and which is therefore assigned to the second cylinder group leads back to or opens out into the first fresh gas line assigned to the first cylinder group, specifically in each case downstream of a shut-off element arranged in the fresh gas lines. With such a design, it is then possible to realize a method implementation in which, when the shut-off element in the first fresh gas line is open and at the same time the shut-off element in the second fresh gas line is substantially closed, exhaust gas is supplied to the second fresh gas line via the first exhaust-gas recirculation line, while in the inverse situation, when the shut-off element in the first fresh gas line is substantially closed and at the same time the shut-off element in the second fresh gas line is open, exhaust gas is supplied to the first fresh gas line via the second exhaust-gas recirculation line.

In a preferred implementation of the invention, the fresh gas lines lead to the internal combustion engine, as charge air lines, downstream of a charger of an exhaust-gas turbocharger, in particular downstream of a compressor of an exhaust-gas turbocharger. The exhaust lines themselves preferably lead to a turbine of the exhaust-gas turbocharger, wherein the exhaust-gas recirculation lines branch off from the exhaust lines upstream, and therefore at the high pressure side. Particularly advantageous exhaust-gas recirculation which is optimized with regard to the scavenging pressure gradient is obtained in particular in conjunction with a turbocharger arrangement of said type.

In an embodiment which is particularly preferable in this regard, it is provided that a charge air cooler is arranged downstream of the charger, to which charge air cooler is conducted a single charge air flow, wherein the charge air lines branch off downstream of the charge air cooler and lead in two-channel form to the two cylinder groups of the internal combustion engine, in particular to an intake pipe region assigned to each cylinder group. The overall number of components required can advantageously be reduced with such a branch downstream of the charge air cooler.

It is self-evident that further components may also additionally be provided, for example cooling means and/or throttle and/or shut-off elements in the region of the exhaust-gas recirculation lines, to name but one example.

For particularly good exhaust-gas recirculation rates, it has proven to be expedient for at least a part of the outlet valves of that cylinder group which is not shut off from the fresh gas to be opened substantially at the same time as or directly after the closing of the fresh-gas-line-mounted shut-off element of the other fresh gas line, in particular in a range between 0 and 60 degrees crank angle after the closing of the fresh-gas-line-mounted shut-off element. Alternatively and/or additionally thereto, it has proven to be advantageous for the at least one outlet valve of that cylinder group which is not shut off from the fresh gas to be opened substantially at the same time as or directly after a defined pressure value, in particular a pressure maximum, is reached in the respectively associated cylinder.

Other features which are considered as characteristic for the invention are set forth in the appended claims.

Although the invention is illustrated and described herein as embodied in a method and device for operating an internal combustion engine, in particular an internal combustion engine of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single FIGURE of the drawing is a schematic of an exemplary embodiment of an internal combustion engine.

DETAILED DESCRIPTION OF THE INVENTION

Referring now to the FIGURE of the drawing in detail, there is shown a schematic of an internal combustion engine 1. The exemplary embodiment is a six-cylinder in-line internal combustion engine. Here, those cylinders of the internal combustion engine 1 which are denoted by I, II, and III form a first cylinder group 2, while those cylinders of the internal combustion engine 1 which are denoted by IV, V and VI form a second cylinder group 3.

The exemplary assembly shown in the FIGURE also comprises an exhaust-gas turbocharger 4 with a compressor 5 and a turbine 6. A charge-air cooler 7 is connected downstream of the compressor 5 and upstream of the internal combustion engine. A charge air line 8 leads from the compressor 5 via the charge-air cooler 7 in the direction of the internal combustion engine 1, branching, downstream of the charge-air cooler 7, into a first charge air line 8a and a second charge air line 8b, which therefore lead in two-channel form to the internal combustion engine 1. Here, the first charge air line 8a is connected in terms of flow to the first cylinder group 2 via an intake pipe region 9, and the second charge air line 8b is connected in terms of flow to the second cylinder group 3 via a second intake pipe region 10. Here, in the conventional way, each cylinder of the internal combustion engine is assigned an intake pipe, which intake pipes form intake pipe regions 9, 10 which, in the present case, are regarded as an integral constituent part of the charge air lines 8a and 8b.

In each case one switching valve 11, 12 which functions as a shut-off element is integrated into each of the two charge air lines 8a, 8b upstream of the intake pipe regions 9, 10 of the charge air lines 8a, 8b and, in this case, by way of example, downstream of the charge air cooler 7, which switching valves 11, 12 are coupled via control lines 13, 14 (illustrated here by dash-dotted lines) to a control and/or regulating device 15, which is for example a constituent part of an engine control unit. The term "regulating" as used here, is synonymous with "closed-loop control" and, as such, the device 15, which may be integrated in the ECU, may be a control unit, a closed-loop controller, or a hybrid.

Furthermore, the assembly which is shown here by way of the exemplary embodiment comprises in each case one exhaust line 16, 17 for each of the two cylinder groups 2, 3. In the concrete example here, the first exhaust line 16 is assigned to the first cylinder group 2, while the second exhaust line 17 is assigned to the second cylinder group 3. The two exhaust lines 16, 17 have an exhaust manifold 18, 19 which adjoins the internal combustion engine 1 in the conventional way and which, in this case, is regarded as an integral constituent part of the two exhaust lines 16, 17 which form a two-channel exhaust system. The two exhaust lines 16, 17 then lead to the turbine 6 and, if appropriate, are merged to form a single exhaust line 20, as shown here.

In each case one exhaust-gas recirculation line 21, 22 branches off from the two exhaust lines 16, 17 upstream of the turbine 6, and therefore at the high-pressure side, and more preferably downstream of the exhaust manifold 18, 19. Here, a throttle and shut-off element 23 is for example integrated into each of said exhaust-gas recirculation lines 21, 22, which throttle and shut-off element is illustrated in highly schematic form and by way of example here. Said two exhaust-gas return lines 21, 22 may likewise lead via an exhaust-gas recirculation cooler 24. The exhaust-gas recirculation lines 21, 22 may self-evidently also be formed without such a throttle and shut-off element and/or without such an exhaust-gas recirculation cooler 24. If appropriate, should it prove to be necessary, flutter valves could also be integrated into the exhaust-gas recirculation lines, though this is not illustrated.

The first exhaust-gas recirculation line 21 branches off from the first exhaust line 16 and opens out, in a crossed-channel configuration according to the invention, into the second charge air line 8b, specifically preferably downstream of the switching valves 11, 12 and upstream of the intake pipe region 10. Similarly, the second exhaust-gas recirculation line 22 branches off from the second exhaust line 17 and opens out, in a crossed-channel configuration, into the first charge air line 8a, specifically likewise preferably upstream of the intake pipe region 9 and downstream of the associated switching valve 11.

The two switching valves 11, 12 are actuated by the control and/or regulating device 15 via the control lines 13, 14 according to predefined exhaust-gas recirculation parameters, in such a way that said switching valves are closed and opened cyclically, that is to say alternately, as illustrated by way of example in FIG. 1. In the FIGURE, the switching valve 11 is closed and the switching valve 12 is open, such that no fresh gas can flow via the switching valve 11 and therefore the first charge air line 8a to the cylinders I, II, III of the first cylinder group 2. In contrast, as a result of the open position of the switching valve 12, fresh gas can flow via the second charge air line 8b to the cylinders IV, V, VI of the second cylinder group 3. As a result of this switching configuration of the switching valves 11, 12, a vacuum is generated in the intake pipe region 9 of the first cylinder group 2, which vacuum has the effect that exhaust gas is drawn out of the second exhaust line 17 via the exhaust-gas recirculation line 22 and supplied to the cylinders of the first cylinder group 2. In contrast, the second cylinder group 3 to which fresh gas is supplied is not supplied with any exhaust gas, or is supplied with only an insignificant amount of exhaust gas, via the exhaust-gas recirculation line 21, such that overall, in such an operating mode, a very high exhaust-gas recirculation rate into the first cylinder group 2 is obtained, which corresponds to a temporarily highly negative scavenging gradient such that a large amount of exhaust gas is sucked into the intake pipe region 9 and therefore onward into the first cylinder group during the fueled operation of the first cylinder group 2. In this way, the charging of the cylinders I, II, III of the first cylinder group 2 can be improved considerably in relation to parallel exhaust-gas recirculation. This likewise results in significantly improved $NO_x$ reduction.

After a defined time period, for example 240 degrees crank angle or crankshaft revolution, the switching valves 11, 12 are then once more actuated by the control and regulating device 15 and the switching valve 11 is opened while the switching valve 12 is closed. Here, the process is then correspondingly reversed, and fresh gas or charge air is supplied to the first cylinder group 2 via the first charge air line 8a, while exhaust gas from the first exhaust line 16 is supplied via the exhaust-gas recirculation line 21 into the intake pipe region 10 upstream of the second cylinder group 3 during the fueled operation of the second cylinder group 3.

The invention claimed is:
1. A method for operating an internal combustion engine, the internal combustion engine having:
   a plurality of cylinders arranged in cylinder groups each having at least one cylinder;
   a multi-channel fresh gas system for supplying fresh gas to the cylinders of the internal combustion engine, the fresh gas system having a plurality of fresh gas lines respectively leading to different cylinder groups;
   at least one shut-off element disposed in each of the fresh gas lines and connected to a control and/or regulating device for selectively disabling a supply of fresh gas to the internal combustion engine to a defined extent in a controlled or regulated manner as a function of defined internal combustion engine operating parameters;
   a multi-channel exhaust system for discharging exhaust gas from the cylinders, the exhaust system having a plurality of exhaust lines leading away from the cylinder groups; and
   a multi-channel exhaust-gas recirculation system formed with a plurality of exhaust-gas recirculation lines, for recirculating exhaust gas from the exhaust system to the fresh gas system, wherein the exhaust-gas recirculation lines branch off from the exhaust lines and lead back to the fresh gas system;
the method which comprises:
conducting the exhaust gas in crossed-channel exhaust-gas recirculation by leading back the exhaust-gas recirculation lines branching off from the exhaust lines of a given channel to fresh gas lines of a respectively different channel during a fueled operation of the different channel;
actuating the shut-off elements of the individual fresh gas lines such that a fresh gas line that is shut off from the fresh gas supply by way of a shut-off element is supplied with exhaust gas from an exhaust line of a different channel, whose associated fresh gas line is not shut off from the fresh gas supply, via an exhaust-gas recirculation line;
providing a two-channel fresh gas system for supplying the fresh gas to the cylinders of the internal combustion engine, a first fresh gas line of the fresh gas system leading to a first cylinder group and a second fresh gas line of the fresh gas system leading to a second cylinder group, each of the fresh gas lines having at least one shut-off element coupled to the control and/or regulating device for enabling or shutting off the supply of fresh gas to the internal combustion engine;
providing a two-channel exhaust system for discharging the exhaust gas from the cylinders, a first exhaust line of the exhaust system leading away from the first cylinder group and a second exhaust line of the exhaust system leading away from the second cylinder group;
providing a two-channel exhaust-gas recirculation system for recirculating exhaust gas from the exhaust system to the fresh gas system, a first exhaust-gas recirculation line of the exhaust-gas recirculation system branching off from the first exhaust line and a second exhaust-gas recirculation line of the exhaust-gas recirculation system branching off from the second exhaust line;
conducting the exhaust recirculation in a crossed-channel exhaust-gas recirculation, in which the first exhaust-gas recirculation line branching off from the first exhaust line and thus carrying exhaust gas from the first cylinder group issues into the second fresh gas line assigned to the second cylinder group, and in which the second exhaust-gas recirculation line branching off from the second exhaust line and thus carrying exhaust gas from the second cylinder group issues into the first fresh gas line assigned to the first cylinder group;
wherein the first exhaust-gas recirculation line issues into the second fresh gas line downstream of a second shut-off element in the second fresh gas line, and the second exhaust-gas recirculation line issues into the first fresh gas line downstream of a first shut-off element in the first fresh gas line;
opening the first shut-off element in the first fresh gas line and at the same time substantially closing the second shut-off element in the second fresh gas line, for supplying exhaust gas to the second fresh gas line via the first exhaust-gas recirculation line during a fueled operation of the second cylinder group; and
after opening the first shut-off element in the first fresh gas line and at the same time substantially closing the second shut-off element in the second fresh gas line, subsequently substantially closing the first shut-off element in the first fresh gas line and at the same time opening the second shut-off element in the second fresh gas line, for supplying exhaust gas to the first fresh gas line via the second exhaust-gas recirculation line during a fueled operation of the first cylinder group.

2. The method according to claim 1, wherein the internal combustion engine is an internal combustion engine of a motor vehicle.

3. The method according to claim 1, wherein a number of the exhaust lines corresponds to a number of the fresh gas lines.

4. The method according to claim 1, which comprises opening at least a part of the outlet valves of that cylinder group which is not shut off from the fresh gas substantially simultaneously with, or immediately after, the closing of the fresh-gas-line-mounted shut-off element of the other fresh gas line.

5. The method according to claim 1, which comprises opening at least a part of the outlet valves of that cylinder group which is not shut off from the fresh gas within a range between 0 and 60 degrees crank angle after the closing of the fresh-gas-line-mounted shut-off element.

6. The method according to claim 1, which comprises opening the at least one outlet valve of the cylinder group that is not shut off from the fresh gas substantially simultaneously with, or immediately after, a defined pressure value is reached in the respectively associated cylinder.

7. The method according to claim 6, wherein the defined pressure value is a pressure maximum.

8. A method for operating an internal combustion engine, the internal combustion engine having:
   a plurality of cylinders arranged in cylinder groups each having at least one cylinder;
   a multi-channel fresh gas system for supplying fresh gas to the cylinders of the internal combustion engine, the fresh gas system having a plurality of fresh gas lines respectively leading to different cylinder groups;
   at least one shut-off element disposed in each of the fresh gas lines and connected to a control and/or regulating device for selectively disabling a supply of fresh gas to the internal combustion engine to a defined extent in a controlled or regulated manner as a function of defined internal combustion engine operating parameters;
   a multi-channel exhaust system for discharging exhaust gas from the cylinders, the exhaust system having a plurality of exhaust lines leading away from the cylinder groups; and
   a multi-channel exhaust-gas recirculation system formed with a plurality of exhaust-gas recirculation lines, for recirculating exhaust gas from the exhaust system to the fresh gas system, wherein the exhaust-gas recirculation lines branch off from the exhaust lines and lead back to the fresh gas system;
the method which comprises:
conducting the exhaust gas in crossed-channel exhaust-gas recirculation by leading back the exhaust-gas recirculation lines branching off from the exhaust lines of a given channel to fresh gas lines of a respectively different channel during a fueled operation of the different channel;
actuating the shut-off elements of the individual fresh gas lines such that a fresh gas line that is shut off from the fresh gas supply by way of a shut-off element is supplied with exhaust gas from an exhaust line of a different channel, whose associated fresh gas line is not shut off from the fresh gas supply, via an exhaust-gas recirculation line.

9. The method according to claim 1, which further comprises disposing a cooler in at least one exhaust gas recirculation line selected from the group consisting of the first exhaust line and the second exhaust-gas recirculation line.

10. The method according to claim 1, which further comprises disposing a cooler in at least one of the plurality of exhaust gas recirculation lines.

\* \* \* \* \*